US012054907B2

(12) United States Patent
Jang

(10) Patent No.: US 12,054,907 B2

(45) Date of Patent: Aug. 6, 2024

(54) VARIABLE SLIDING MANHOLE SAFETY GUARD

(71) Applicant: ESSYSTEM Co., Ltd, Jecheon-si (KR)

(72) Inventor: Tae Hyun Jang, Daejeon (KR)

(73) Assignee: ESSYSTEM Co., Ltd, Jecheon-si (KR)

( * ) Notice: Subject to any disclaimer, the term of this patent is extended or adjusted under 35 U.S.C. 154(b) by 0 days.

(21) Appl. No.: 18/166,632

(22) Filed: Feb. 9, 2023

(65) Prior Publication Data

US 2023/0340751 A1 Oct. 26, 2023

(30) Foreign Application Priority Data

Apr. 22, 2022 (KR) ........................ 10-2022-0050289

(51) Int. Cl.

*E06C 7/18* (2006.01)
*E02D 29/12* (2006.01)

(52) U.S. Cl.

CPC ............ *E02D 29/122* (2013.01); *E06C 7/182* (2013.01); *E06C 7/185* (2013.01)

(58) Field of Classification Search

CPC ....... E02D 29/122; E02D 29/12; E02D 29/14; E06C 7/182; E06C 7/185; E06C 7/482; E06C 9/00; E06C 9/02; E06C 9/04

See application file for complete search history.

(56) References Cited

U.S. PATENT DOCUMENTS

| | | | | |
|---|---|---|---|---|
| 6,607,053 B1 * | 8/2003 | Warren | E06C 9/02 | 182/106 |
| 7,137,478 B2 * | 11/2006 | Becker | E04G 5/10 | 182/230 |
| 8,245,452 B2 * | 8/2012 | Koteskey | E02D 29/124 | 405/133 |
| 11,091,957 B2 * | 8/2021 | Voss | E06C 7/08 | |

(Continued)

FOREIGN PATENT DOCUMENTS

| | | |
|---|---|---|
| CN | 108035427 A * | 5/2018 |
| JP | 09-279615 A | 10/1997 |
| JP | 2019-124055 A | 7/2019 |

(Continued)

OTHER PUBLICATIONS

Written Decision on Registration for KR 10-2022-0050289 dated Aug. 3, 2022.

(Continued)

*Primary Examiner* — Colleen M Chavchavadze

(74) *Attorney, Agent, or Firm* — Sughrue Mion, PLLC

(57) ABSTRACT

Disclosed is a variable sliding manhole safety guard including an installation support part that is installed on an inner wall of a manhole to be installed and has a rail structure vertically extending by a predetermined length and configured to change a vertical position of a movement guide, the movement guide that is mounted on the rail structure to change a vertical position, has a structure vertically extending by a predetermined height, and is mounted on a safety (Continued)

fence in an integrated structure, the safety fence which is mounted on the movement guide in an integrated structure and includes a plurality of frames forming a cylindrical structure having an outer diameter corresponding to an inner diameter of a manhole entrance, and in which an openable entrance door is installed in an upper one surface thereof.

1 Claim, 9 Drawing Sheets

(56) References Cited

U.S. PATENT DOCUMENTS

| | | | | |
|---|---|---|---|---|
| 11,519,224 | B2 * | 12/2022 | Wells | E04G 7/34 |
| 2014/0144006 | A1 * | 5/2014 | Ashouri | E06C 7/185 |
| | | | | 29/525.08 |

FOREIGN PATENT DOCUMENTS

| | | | |
|---|---|---|---|
| KR | 10-2001-0078628 | A | 8/2001 |
| KR | 10-2004-0001578 | A | 1/2004 |
| KR | 10-1456703 | B1 | 11/2014 |
| KR | 10-1815976 | B1 | 1/2018 |
| KR | 10-1831720 | B1 | 2/2018 |
| KR | 10-1977528 | B1 | 5/2019 |
| KR | 10-2020-0091314 | A | 7/2020 |
| KR | 10-2219118 | B1 | 2/2021 |
| KR | 10-2297108 | B1 | 9/2021 |
| KR | 10-2022-0040181 | A | 3/2022 |

OTHER PUBLICATIONS

Request for the Submission of an Opinion for KR 10-2022-0050289 dated Jun. 23, 2022.

* cited by examiner

VARIABLE SLIDING MANHOLE SAFETY GUARD

CROSS-REFERENCE TO RELATED APPLICATION

This application claims priority to and the benefit of Korean Patent Application No. 10-2022-0050289 filed on Apr. 22, 2022, the disclosure of which is incorporated herein by reference in its entirety.

BACKGROUND

1. Field of the Invention

The present disclosure relates to a variable sliding manhole safety guard, and more particularly, to a variable sliding manhole safety guard that is installed inside a manhole and may have a handrail structure and a ladder installed by extracting the handrail structure and the ladder from the inside of the manhole as needed.

2. Discussion of Related Art

In general, a movement part, by which a worker may move, such as a ladder vertically fixed a wall surface inside a working space at an entrance through which the worker enters and exit the working space in a vertical direction and footplates installed spaced apart in the vertical direction beside an inner wall surface are provided.

Further, the worker may enter and exit the working space through the entrance and move to a working position inside the working space using the movement part.

In particular, a manhole communicating with the ground so that the worker may enter and exit, for the purpose of maintenance work, an underground space in which water supply and drainage facilities, communication facilities and wiring, power transmission and distribution facilities and wiring, and the like are buried is generally provided, and the manhole is normally closed with a manhole cover.

Further, when the worker opens the manhole cover to work in the underground space and goes underground, the worker uses the movement part provided on the inner wall surface of the underground space in a vertical passage connected from the ground having the manhole cover to the underground space.

Further, the manhole is normally covered with the manhole cover to prevent the falls of pedestrians or vehicles passing over the manhole and is opened for entry and exit only during the maintenance work.

When a cover for opening and closing the entrance as in the manhole is provided, to open or close the cover, the movement part, that is, the ladder or the footplates, should be installed so as not to exposed to the outside.

In relation to this technology, Korean Patent Publication No. 2014-49239 discloses a technology of a safety handle device, and in this configuration, as illustrated in FIG. 1, a safety handle member 10 is coupled to a handle guide member to be vertically movable, and the handle guide member 20 guides the safety handle member 10 so that the safety handle member 10 vertically moves. A movement part 12 that is upright is formed on one of the safety handle member 10 and the handle guide member 20, the movement part 12 is inserted into the other one thereof, and thus a movement guide insertion part 21 that vertically moves is formed.

Further, the movement part 12 is formed at a lower portion of the safety handle member 10, the movement part 12 formed at a lower portion of the safety handle member 10 is inserted into and coupled to the movement guide insertion part 21 formed inside the handle guide member 20, the movement part 12 vertically moves inside the movement guide insertion part 21, and the guide member 20 is mounted on both sides of an entry/exit ladder 2 installed on a lower side of an entrance 1 inside the working space.

However, the above-described safety handle device is configured such that a handle 11 is connected to the guide member 20 and thus the safety handle device moves by the movement part 12, and the safety handle device has disadvantages in that workability is degraded because the handle should move, the ladder cannot be used for various purposes, and a separate fixing device is required when the ladder is positioned in a correct location.

Thus, a technology that can solve the above-described problems according to the related art is required.

RELATED ART DOCUMENT

Patent Document (Patent Document 1) Korean Patent Registration No. 10-1831720 (Registration Date: Feb. 19, 2018)

SUMMARY OF THE INVENTION

The present disclosure is directed to providing a variable sliding manhole safety guard which can prevent a ground pedestrian from falling into a manhole in a state in which a manhole cover is open, can prevent accidents of falling into the manhole when a worker enters the manhole for work inside the manhole, and can be installed and utilized only when necessary.

A variable sliding manhole safety guard according to an embodiment of the present disclosure includes an installation support part that is installed on an inner wall of a manhole to be installed and has a rail structure vertically extending by a predetermined length and configured to change a vertical position of a movement guide, the movement guide that is mounted on the rail structure to change a vertical position, has a structure vertically extending by a predetermined height, and is mounted on a safety fence in an integrated structure, the safety fence which is mounted on the movement guide in an integrated structure and includes a plurality of frames forming a cylindrical structure having an outer diameter corresponding to an inner diameter of a manhole entrance, and in which an openable entrance door is installed in an upper one surface thereof, a safety fence position fixing part which is mounted on an upper portion of the safety fence so that a stopping lever performs a rotational operation and in which a stopping member configured to fix a vertical height of the movement guide by the rotational operation of the stopping lever is mounted at a lower end thereof, and a ladder that is adjacent to the installation support part, is installed on the inner wall of the manhole, and has a structure extending from the manhole entrance to an inside of the manhole by a predetermined length.

The installation support part may include a side wall installation plate that has a plate-shaped structure in which a curved structure corresponding to the inner wall of the manhole is formed and has a rectangular plate-shaped structure entering the manhole from the manhole entrance by a predetermined length, an upper end fixing plate that protrudes laterally from an upper end of the side wall installation plate by a predetermined length and is bound to an upper end of a rail pipe, a lower portion fixing plate that protrudes laterally from a lower end of the side wall installation plate by a predetermined length and is bound to an outer circumferential surface of a lower portion of the rail pipe; and a rail formation portion that is mounted by the upper end fixing plate and the lower portion fixing plate and has a hollow pipe structure extending from the manhole entrance to the inside of the manhole by a predetermined length.

The installation support part may further include a fixed pulley that is mounted on a lower surface of the lower portion fixing plate and supports vertical driving of a balance wire, the balance wire that is mounted at a lower end of the movement guide, extends upward, passes through the fixed pulley, and extends downward, and is made of a material having a predetermined strength, and a weight that is mounted at one end of the balance wire and has the same weight as a sum of weights of the movement guide and the safety fence.

The installation support part may further include an entrance footplate that is mounted on the side wall installation plate in an integrated structure, has a plate-shaped structure protruding laterally by a predetermined width, and is spaced apart from a position in which the ladder is mounted by a predetermined angle in a plan view.

The movement guide may include a vertical extension portion that has a pipe structure having the same outer diameter as an inner circumferential surface of the rail formation portion, has a structure vertically extending by a predetermined length, and is bound to an upper end of the safety fence at an upper end thereof in an integrated structure, an upper end guide plate that is mounted at an upper end of the vertical extension portion, has a plate-shaped structure bound to the upper end of the safety fence in an integrated structure, and rotatably fixes an upper end of the safety fence position fixing part; and a lower end guide plate that is mounted at a lower end of the vertical extension portion, has a plate-shaped structure bound to a lower end of the safety fence in an integrated structure, and rotatably fixes a lower end of the safety fence position fixing part.

The movement guide may further include a first buffer member that is mounted on a lower surface of the upper end guide plate and is made of a material having an elastic restoring force having a predetermined magnitude to absorb an impact with the upper end fixing plate of the installation support part and a second buffer member that is mounted on an upper surface of the lower guide plate and is made of a material having an elastic restoring force having a predetermined magnitude to absorb an impact with a lower end of the rail formation portion.

The safety fence may include an upper end ring frame that is bound to an upper end of the movement guide in an integrated structure and has a ring structure corresponding to the inner diameter of the manhole entrance, a lower end ring frame that is bound to a lower end of the movement guide in an integrated structure and has a ring structure corresponding to the inner diameter of the manhole entrance, and a vertical frame that connects the upper end ring frame and the lower end ring frame in an integrated structure, is provided as a plurality of vertical frames mounted to be spaced apart from a center of the upper end ring frame by a predetermined angle in a plan view, and has a square bar structure extending from the manhole entrance toward the inside of the manhole by a predetermined length.

The variable sliding manhole safety guard may include an environment detection unit that is mounted at a lower end of the ladder, detects a temperature, a humidity, and a harmful gas inside the manhole in real time, and transmits the detected result to a controller, an air circulation unit that has a structure mounted on an upper end of the safety fence and extending to the lower end of the ladder, is operated by a control signal of the controller to supply air outside the manhole into the manhole so as to discharge air inside the manhole to the outside of the manhole when the safety fence is extracted from the manhole entrance and is disposed outside, a light emission member that is provided as a plurality of light emission members mounted on an outer circumferential surface of the safety fence and the ladder to be spaced apart from each other at regular intervals, and is operated by the control signal of the controller to emit a preset light, and the controller that is mounted on one side of the installation support part, is operated by receiving a control value from an operator while wirelessly linked with a smart device of the operator, and controls the operation of the air circulation unit and the light emission member on the basis of the data detected by the environment detection unit.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present disclosure will be described in detail with reference to the accompanying drawings. Prior to this, the terms or words used in the present specification and the appended claims should not be interpreted as being limited to conventional or dictionary meanings, but should be interpreted as meanings and concepts consistent with the technical spirit of the present disclosure.

Throughout the present specification, when a first member is located "on" a second member, this case includes not only a case in which the first member is in contact with the second member but also a case in which a third member is present between the two members.

Throughout the present specification, when a part "includes" a component, this means that another component is not excluded but may be further included unless otherwise stated.

Figure 1:
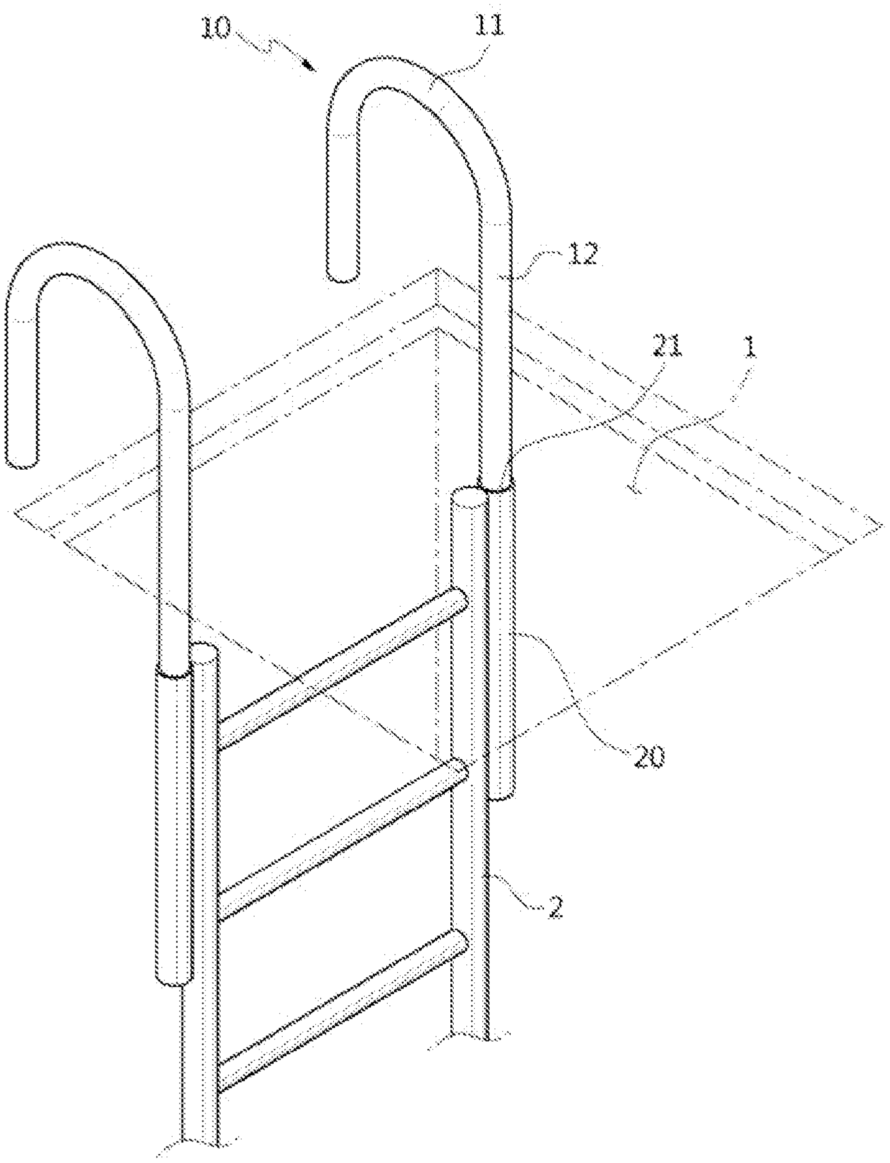
PRIOR ART FIG. 1
FIG. 1 is a perspective view illustrating a manhole working ladder according to a related art.
Figure 2:
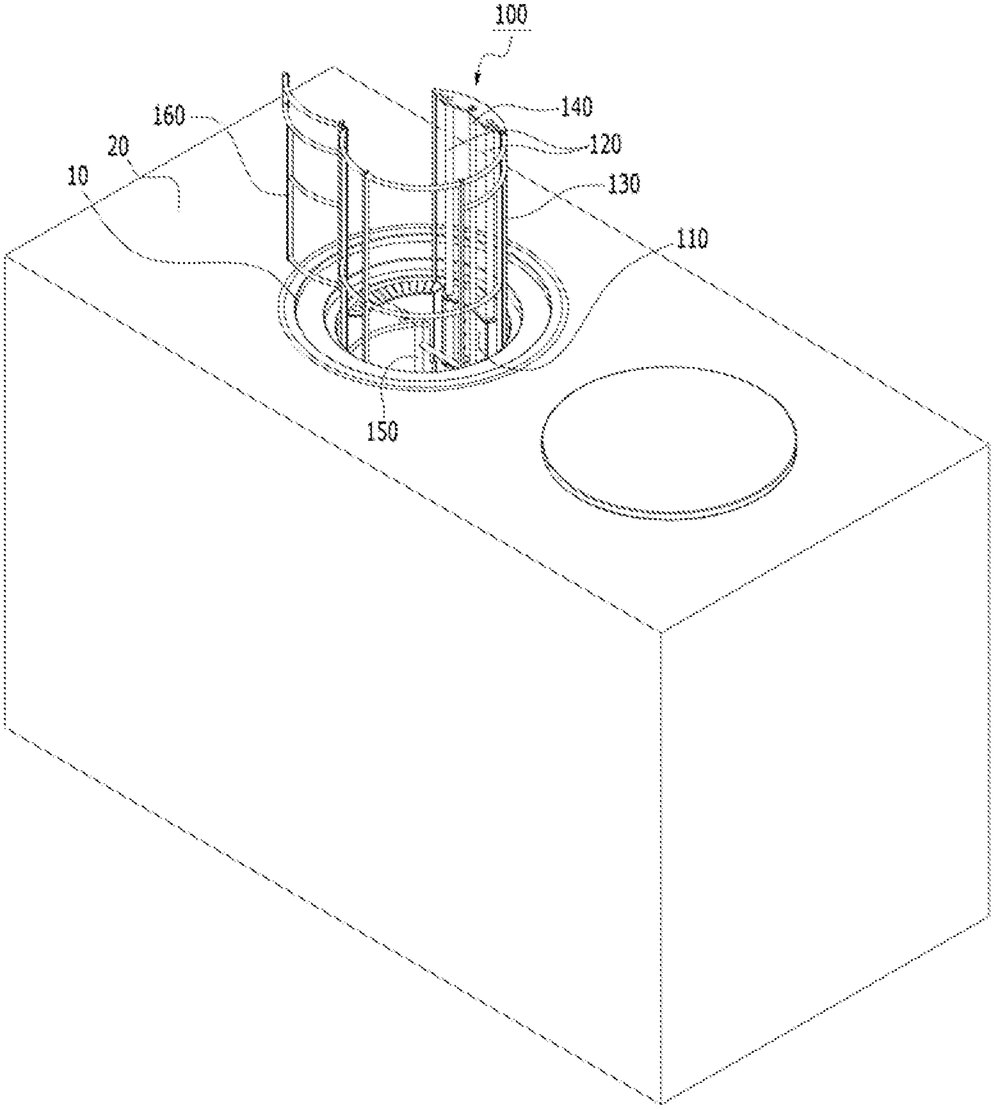
FIG. 2 is a perspective view illustrating a variable sliding manhole safety guard according to an embodiment of the present disclosure.
Figure 3:
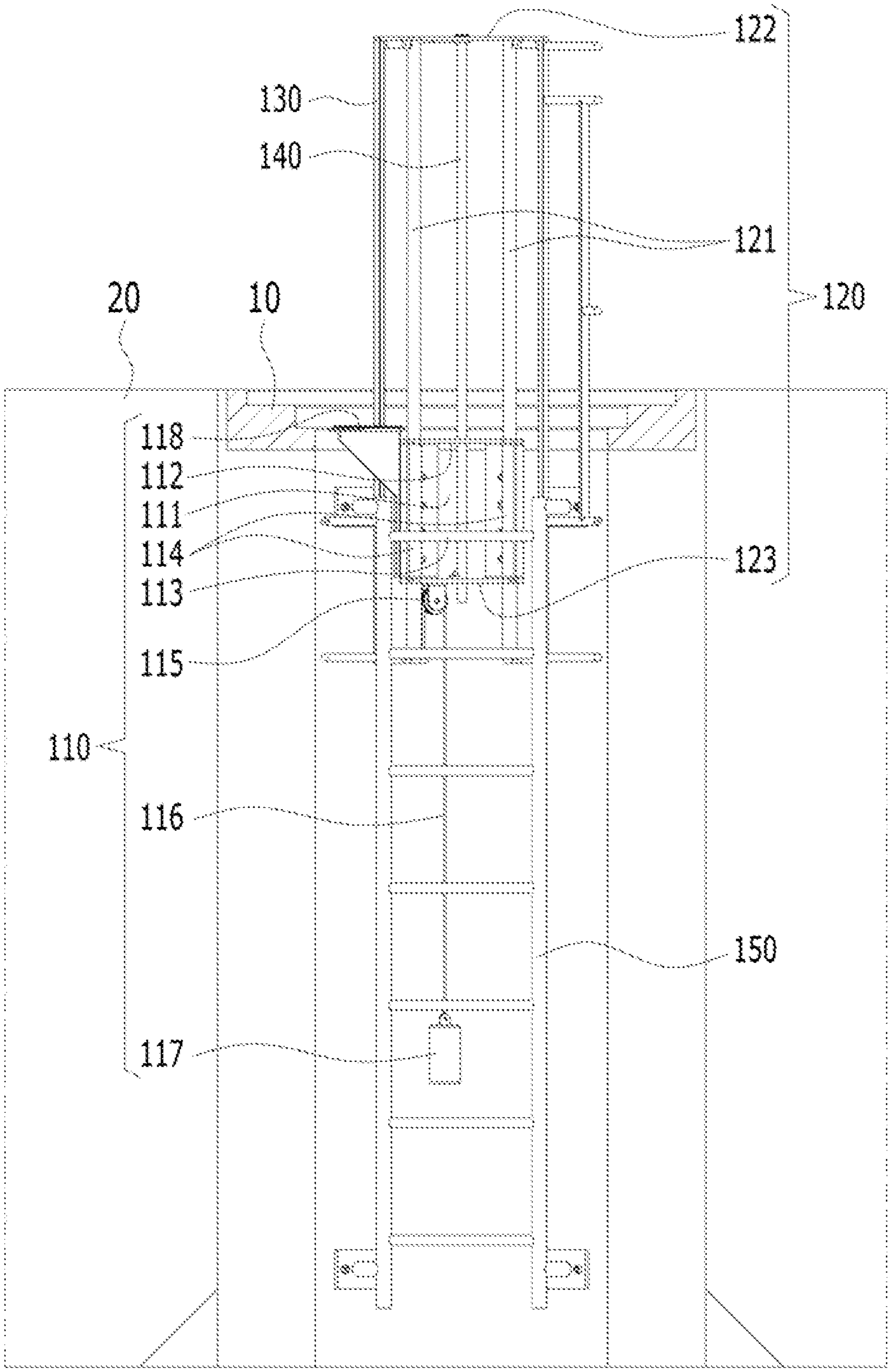
FIG. 3 is a front view illustrating a state in which a safety fence of the variable sliding manhole safety guard illustrated in FIG. 2 is extracted from a manhole entrance.
Figure 4:
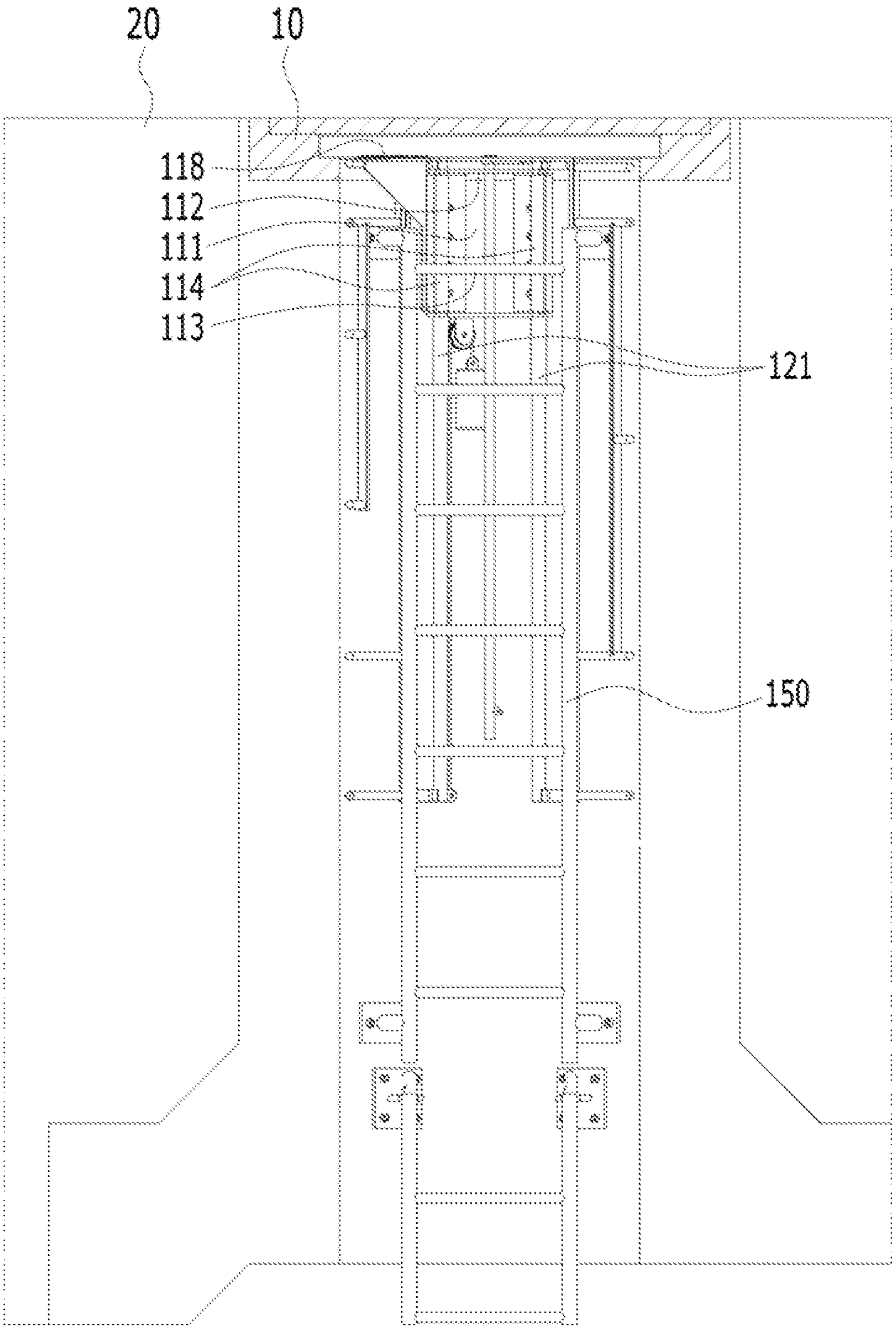
FIG. 4 is a front view illustrating a state in which the safety fence of the variable sliding manhole safety guard illustrated in FIG. 3 is inserted into a manhole.

FIG. 2 is a perspective view illustrating a variable sliding manhole safety guard according to an embodiment of the present disclosure, FIG. 3 is a front view illustrating a state in which a safety fence of the variable sliding manhole safety guard illustrated in FIG. 2 is extracted from a manhole entrance, and FIG. 4 is a front view illustrating a state in which the safety fence of the variable sliding manhole safety guard illustrated in FIG. 3 is inserted into a manhole.

Referring to these drawings, a variable sliding manhole safety guard 100 according to the present embodiment may include an installation support part 110, a movement guide 120, a safety fence 130, a safety fence position fixing part 140, and a ladder 150 having a specific structure, so that a ground pedestrian can be prevented from falling into the manhole in a state in which a manhole cover is open, accidents in which a worker falls into the manhole can be prevented when the worker enters the inside of the manhole for the purpose of working inside the manhole, and the variable sliding manhole safety guard can be installed and utilized only when necessary.

Hereinafter, respective components constituting the variable sliding manhole safety guard 100 according to the present embodiment will be described in detail with reference to the drawings.

Figure 5:
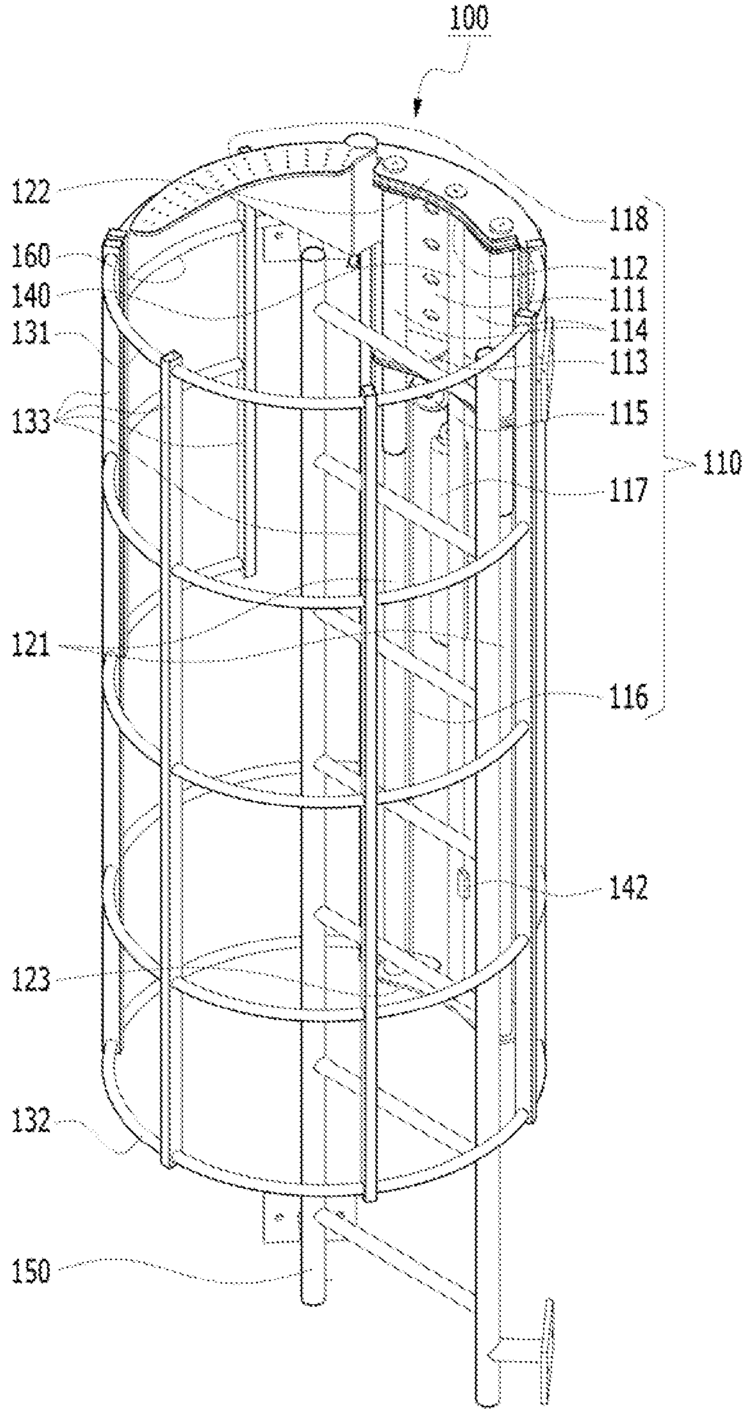
FIG. 5 is a perspective view illustrating a variable sliding manhole safety guard according to another embodiment of the present disclosure.
Figure 6:
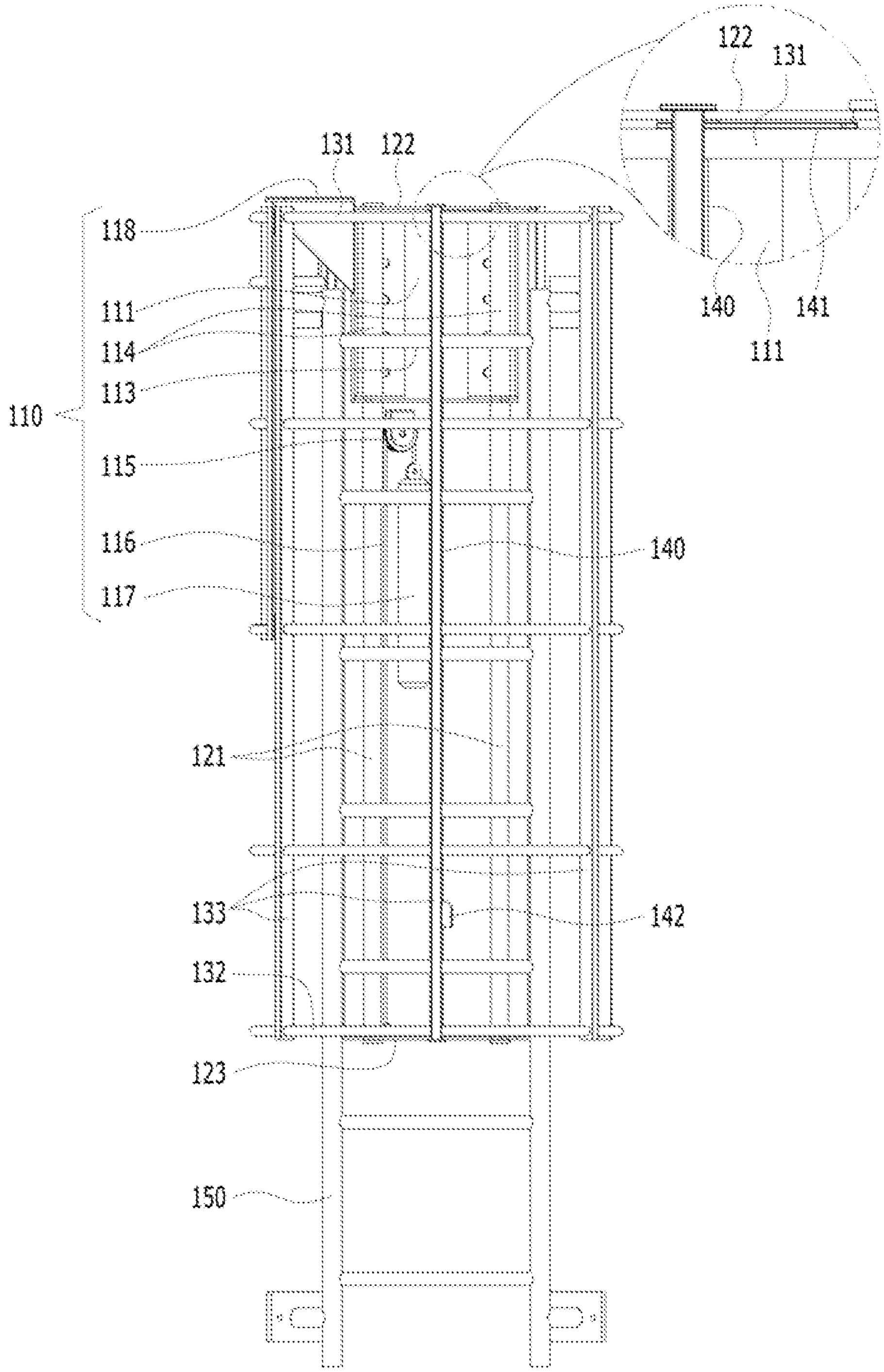
FIG. 6 is a front view illustrating the variable sliding manhole safety guard illustrated in FIG. 5.
Figure 7:
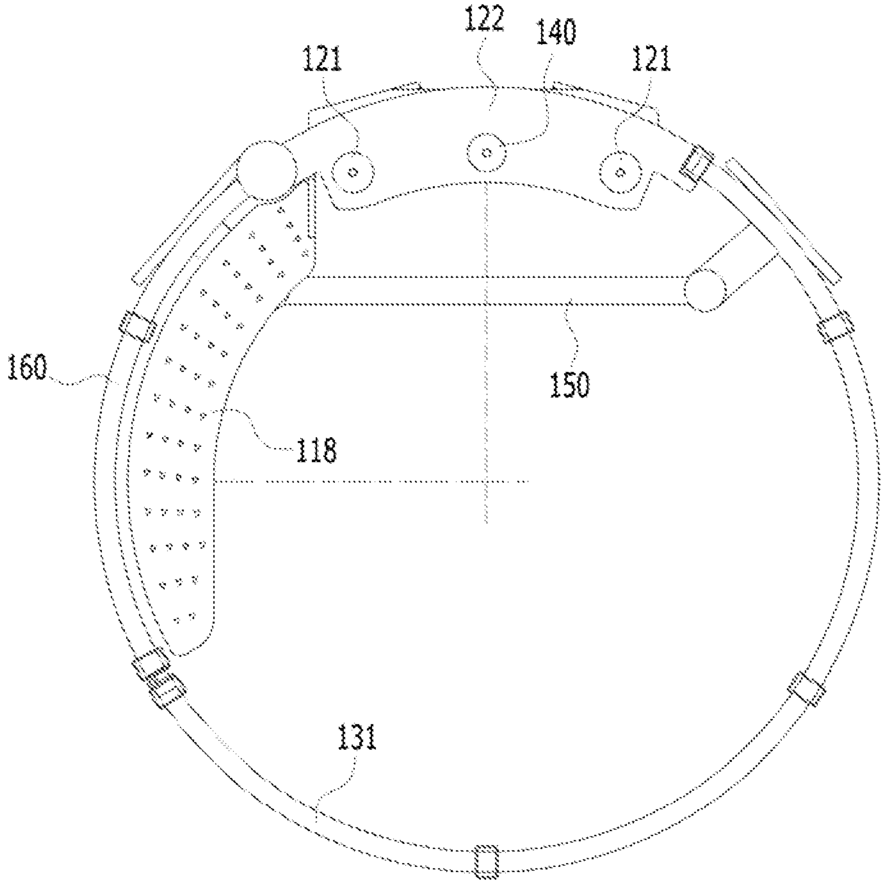
FIG. 7 is a plan view illustrating the variable sliding manhole safety guard illustrated in FIG. 6.
Figure 8:
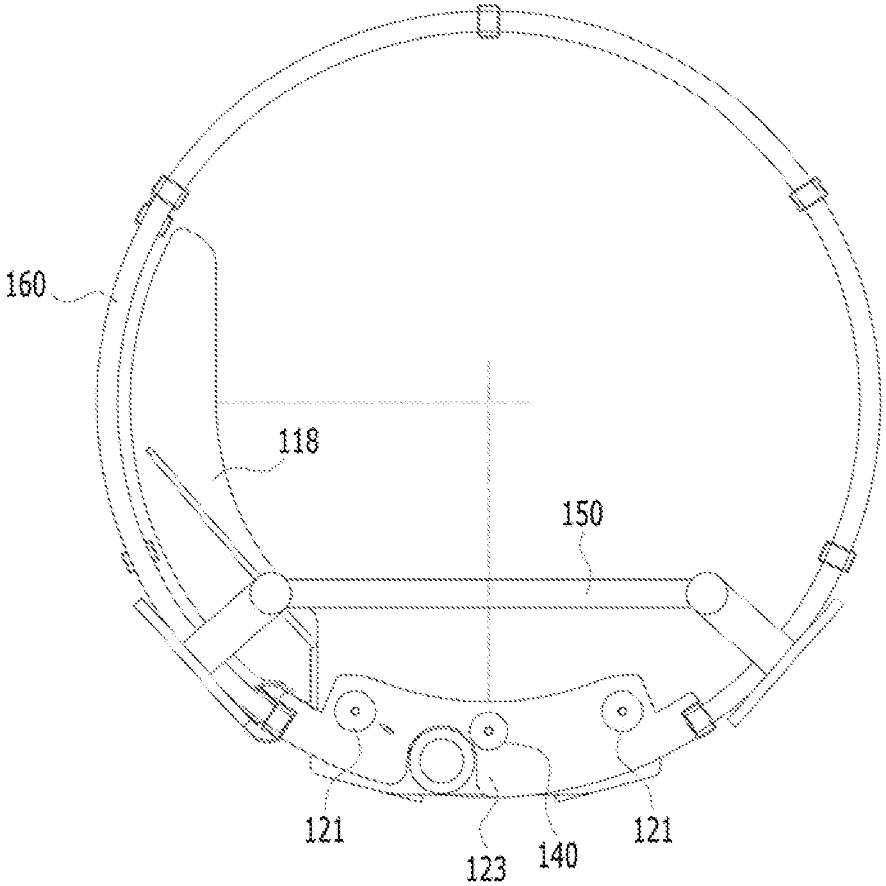
FIG. 8 is a bottom view illustrating the variable sliding manhole safety guard illustrated in FIG. 6.

FIG. 5 is a perspective view illustrating a variable sliding manhole safety guard according to another embodiment of the present disclosure, FIG. 6 is a front view illustrating the variable sliding manhole safety guard illustrated in FIG. 5, FIG. 7 is a plan view illustrating the variable sliding manhole safety guard illustrated in FIG. 6, and FIG. 8 is a bottom view illustrating the variable sliding manhole safety guard illustrated in FIG. 6.

Referring to these drawings, the ladder 150 according to the present embodiment is installed on an inner wall of the manhole to be adjacent to the installation support part 110 and has a structure extending from the manhole entrance to the inside of the manhole by a predetermined length.

The installation support part 110 of the variable sliding manhole safety guard 100 according to the present embodiment is installed on the inner wall of the manhole to be installed, and may have a structure having a rail structure that vertically extends by a predetermined length and is configured to change a vertical position of the movement guide 120.

As illustrated in FIGS. 3 to 6, the installation support part 110 according to the present embodiment may include a side wall installation plate 111, an upper end fixing plate 112, a lower portion fixing plate 113, and a rail formation portion 114 having a specific structure.

In detail, the side wall installation plate 111 of the installation support part 110 has a plate-shaped structure having a curved structure corresponding to the inner wall of the manhole and has a rectangular plate-shaped structure extending from the manhole entrance into the manhole by a predetermined length. The upper end fixing plate 112 has a structure that protrudes laterally from an upper end of the side wall installation plate 111 by a predetermined length and is bound to an upper end of a rail pipe. The lower portion fixing plate 113 has a structure that protrudes laterally from a lower end of the side wall installation plate 111 by a predetermined length and is bound to an outer circumferential surface of a lower portion of the rail pipe. Further, the rail formation portion 114 may be configured to be mounted by the upper end fixing plate 112 and the lower portion fixing plate 113 and may have a hollow pipe structure extending from the manhole entrance into the manhole by a predetermined length.

In some cases, the installation support part 110 may include a fixed pulley 115, a balance wire 116, and a weight 117 having a specific structure. In detail, the fixed pulley 115 may be configured to be mounted on a lower surface of the lower portion fixing plate 113 and may have a structure to support vertical driving of the balance wire 116. The balance wire 116 may be configured to be mounted on a lower end of the movement guide 120, may extend upward, pass through the fixed pulley 115, and extend downward, and may be made of a material having a predetermined strength. Further, the weight 117 may be configured to be mounted at one end of the balance wire 116 and may have a structure having the same weight as a sum of weights of the movement guide 120 and the safety fence 130.

In this case, according to the present embodiment, the variable sliding manhole safety guard including the side wall installation plate 111, the upper end fixing plate 112, the lower portion fixing plate 113, the rail formation portion 114, the fixed pulley 115, the balance wire 116, and the weight 117, so that the vertical position change of the safety fence 130 can be guided in an accurate direction using the rail structure, the safety fence 130 can be easily and safely extracted using the weight 117 having the same weight as the sum of the weights of the movement guide 120 and the safety fence 130, and as a result, the safety fence 130 can be easily installed while safety is secured may be provided.

The safety fence 130 according to the present embodiment may be configured to be mounted on the movement guide 120 in an integrated structure, may include a plurality of frames forming a cylindrical structure having an outer diameter corresponding to an inner diameter of the manhole entrance, and may have a structure in which an openable entrance door 160 is installed on one side of an upper portion thereof.

Further, as illustrated in FIGS. 5 and 7, an entrance footplate 118 may be further mounted on the side wall installation plate 111 in an integrated structure. In detail, the entrance footplate 118 may be mounted on the side wall installation plate 111 in an integrated structure, may have a plate-shaped structure protruding laterally by a predetermined width, and may be arranged spaced apart from a mounted position of the ladder 150 by a predetermined angle in a plan view.

In this case, according to the present embodiment, the variable sliding manhole safety guard including the openable entrance door 160 and the entrance footplate 118 having a specific structure, so that safety of a ground pedestrian can be secured by blocking an area around the open manhole using the safety fence 130, safe entry can be secured using the entrance footplate 118 when the worker enters the inside of the manhole, and as a result, accidents caused by the opening of the manhole and the entrance of the manhole can be prevented may be provided.

Meanwhile, as illustrated in FIGS. 3 to 6, the movement guide 120 according to the present embodiment may be configured to be mounted on the rail structure such that a vertical position thereof is changed, may have a structure vertically extending by a predetermined height, and may be mounted on the safety fence 130 in an integrated structure.

In detail, the movement guide 120 according to the present embodiment may include a vertical extension portion 121, an upper end guide plate 122, and a lower end guide plate 123 having a specific structure. The vertical extension portion 121 of the movement guide 120 may have a pipe structure having the same outer diameter as an inner circumferential surface of the rail formation portion 114, may have a structure vertically extending by a predetermined length, and may have a structure in which an upper end of the safety fence 130 is bound to an upper end thereof in an integrated structure. The upper end guide plate 122 may be configured to be mounted at an upper end of the vertical extension portion 121, may have a plate-shaped structure that is bound to the upper end of the safety fence 130 in an integrated structure, and may have a structure for rotatably fixing an upper end of the safety fence position fixing part 140. Further, the lower end guide plate 123 may be configured to be mounted on a lower end of the vertical extension portion 121, may have a plate-shaped structure bound to a lower end of the safety fence 130 in an integrated structure, and may rotatably fix a lower end of the safety fence position fixing part 140.

In some cases, the movement guide 120 may further include a first buffer member and a second buffer member having a specific structure. The first buffer member may be configured to be mounted on a lower surface of the upper end guide plate 122 and may be made of a material having an elastic restoring force having a predetermined magnitude to absorb an impact with the upper end fixing plate 112 of the installation support part 110. Further, the second buffer member may be configured to be mounted on an upper surface of the lower end guide plate 123 and may be made of a material having an elastic restoring force having a predetermined magnitude to absorb an impact with a lower end of the rail formation portion 114.

Meanwhile, as illustrated in FIGS. 5 and 6, the safety fence position fixing part 140 according to the present embodiment may be configured such that a stopping lever 141 is rotatably mounted on an upper portion of the safety fence 130 and may have a structure in which a stopping member 142 for fixing a vertical height of the movement guide 120 by a rotational operation of the stopping lever 141 is mounted at a lower end thereof.

Further, the safety fence 130 according to the present embodiment may include an upper end ring frame 131, a lower end ring frame 132, and a vertical frame 133 having a specific structure. In detail, the upper end ring frame 131 of the safety fence 130 may be configured to be bound to an upper end of the movement guide 120 in an integrated structure and may have a ring structure corresponding to the inner diameter of the manhole entrance. The lower end ring frame 132 may be configured to be bound to a lower end of the movement guide 120 in an integrated structure and may have a ring structure corresponding to the inner diameter of the manhole entrance. Further, the vertical frame 133 may be configured to connect the upper end ring frame 131 and the lower end ring frame 132 in an integrated structure, may be provided as a plurality of vertical frames 133 mounted to be spaced apart from a center of the upper end ring frame 131 by a predetermined angle in a plan view, and may have a square bar structure extending from the manhole entrance toward the inside of the manhole by a predetermined length.

In this case, according to the present embodiment, the variable sliding manhole safety guard including the safety fence 130 including the upper end ring frame 131, the lower end ring frame 132, and the vertical frame 133 having a specific structure, so that a safety fence structure can be installed by extracting the variable sliding manhole safety guard from the inside to the outside of the manhole when necessary, the manhole cover can be closed by inserting the variable sliding manhole safety guard into the manhole after work, and thus the variable sliding manhole safety guard can be easily and safely utilized may be provided.

Figure 9:
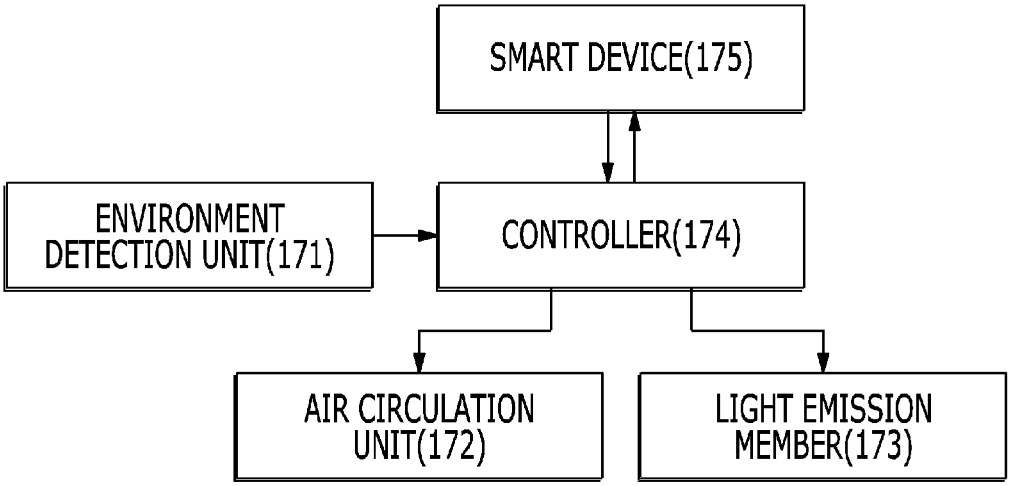
FIG. 9 is a diagram illustrating a variable sliding manhole safety guard according to still another embodiment of the present disclosure.

FIG. 9 is a diagram illustrating a variable sliding manhole safety guard according to still another embodiment of the injection present disclosure.

Referring to FIG. 9, the variable sliding manhole safety guard 100 according to the present embodiment may include an environment detection unit 171, an air circulation unit 172, a light emission member 173, and a controller 174 that perform specific roles.

In detail, the environment detection unit 171 may be mounted on a lower end of the ladder, detect a temperature, a humidity, and harmful gas inside the manhole in real time, and transmit the detected result to the controller 174. The air circulation unit 172 may have a structure mounted on the upper end of the safety fence and extending to the lower end of the ladder and may be operated by a control signal of the controller 174 to supply air outside the manhole into the manhole so as to discharge air inside the manhole to the outside of the manhole when the safety fence is extracted from the manhole entrance and is disposed outside. Further, the light emission member 173 according to the present embodiment may be provided as a plurality of light emission members 173 mounted on an outer circumferential surface of the safety fence and the ladder to be spaced apart from each other at regular intervals and may be operated by the control signal of the controller 174 to emit a preset light.

The controller 174 according to the present embodiment may be configured to be mounted on one side of the installation support part, may be operated by receiving a control value from an operator while wirelessly linked with a smart device 175 of the operator, and can control the operation of the air circulation unit 172 and the light emission member 173 on the basis of the data detected by the environment detection unit 171.

As described above, a variable sliding manhole safety guard according to the present disclosure including an installation support part, a movement guide, a safety fence, a safety fence position fixing part, and a ladder having a specific structure, so that a ground pedestrian can be prevented from falling into the manhole in a state in which a manhole cover is open, accidents in which a worker falls into the manhole can be prevented when the worker enters the inside of the manhole for the purpose of working inside the manhole, and the variable sliding manhole safety guard can be installed and utilized only when necessary may be provided.

Further, the variable sliding manhole safety guard according to the present disclosure including a side wall installation plate, an upper end fixing plate, a lower portion fixing plate, a rail formation portion, a fixed pulley, a balance wire, and a weight having a specific structure, so that the vertical position change of the safety fence can be guided in an accurate direction using a rail structure, the safety fence can be easily and safely extracted using the weight having the same weight as the sum of the weights of the movement guide and the safety fence, and as a result, the safety fence can be easily installed while safety is secured may be provided.

Further, the variable sliding manhole safety guard according to the present embodiment including an openable entrance door and an entrance footplate having a specific structure, so that safety of a ground pedestrian can be secured by blocking an area around the open manhole using the safety fence, safe entry can be secured using the entrance footplate when the worker enters the inside of the manhole, and as a result, accidents caused by the opening of the manhole and the entrance of the manhole can be prevented may be provided.

Further, the variable sliding manhole safety guard according to the present disclosure including the safety fence including an upper end ring frame, a lower end ring frame, and a vertical frame having a specific structure, so that a safety fence structure can be installed by extracting the variable sliding manhole safety guard from the inside to the outside of the manhole when necessary, the manhole cover can be closed by inserting the variable sliding manhole safety guard into the manhole after work, and thus the variable sliding manhole safety guard can be easily and safely utilized may be provided.

In the above detailed description of the present disclosure, only specific embodiments thereof have been described. However, it should be understood that the present disclosure is not limited to particular forms mentioned in the detailed description, but rather, it should be understood that the present disclosure includes all modifications, equivalents, and substitutions within the spirit and scope of the present disclosure as defined by the appended claims.

That is, the present disclosure is not limited to the specific embodiments and descriptions described above, those skilled in the art to which the present disclosure pertains can implement various modifications without departing from the subject matter of the present disclosure as claimed in the appended claims, and such modifications may be present within the protection scope of the present disclosure.

What is claimed is:

1. A variable sliding manhole safety guard to be installed at a manhole comprising:

an installation support part (110) that is installed on an inner wall of the manhole (100) and has a rail structure vertically extending by a predetermined length and configured to change a vertical position of a movement guide (120);

the movement guide (120) that is mounted on the rail structure to change a vertical position, and is integrally connected to a safety fence (130) to form an integrated structure therewith;

the safety fence (130) which is integrally connected to the movement guide (120) to form an integrated structure and includes a plurality of frames forming a cylindrical structure having an outer diameter corresponding to an inner diameter of the manhole entrance, and in which an entrance door (160) configured to be opened and closed is installed on a side thereof;

a safety fence position fixing part (140) which comprises a stopping lever (141) which is mounted over the safety fence (130) and performs a rotational operation, and a stopping member (142) configured to fix a vertical height of the movement guide (120) by the rotational operation of the stopping lever (141) and mounted at a lower part of the safety fence position fixing part (140); and a ladder (150) that is adjacent to the installation support part (110) and is installed in the manhole, and vertically extends by a predetermined length, wherein the installation support part (110) includes:

a side wall installation plate (111) that has a curved structure corresponding to the inner wall of the manhole and extends into to the manhole from the manhole entrance by a predetermined length;

an upper end fixing plate (112) that protrudes laterally from an upper end of the side wall installation plate (111) by a predetermined length and is bound to an upper end of a rail pipe;

a lower portion fixing plate (113) that protrudes laterally from a lower end of the side wall installation plate (111) by a predetermined length and is bound to an outer circumferential surface of a lower portion of the rail pipe;

a rail formation portion (114) that comprises the rail structure and is mounted by the upper end fixing plate (112) and the lower portion fixing plate (113) and has a hollow pipe structure extending from the manhole entrance to the inside of the manhole by a predetermined length; and an entrance foot plate (118) that protrudes laterally by a predetermined width, and is arranged spaced apart from a mounted position of the ladder (150) by a predetermined angle, and adjacent to the entrance door (160) in a plan view, and the movement guide (120) includes:

a vertical extension portion (121) that has a pipe structure having the same outer diameter as an inner circumferential surface of the rail formation portion (114) and vertically extending by a predetermined length, and is bound to an upper end of the safety fence (130) at an upper end thereof in an integrated structure;

an upper end guide plate (122) that is mounted at an upper end of the vertical extension portion (121), and has a plate-shaped structure bound to the upper end of the safety fence (130) in an integrated structure, and rotatably fixes an upper end of the safety fence position fixing part (140); and a lower end guide plate (123) that is mounted at a lower end of the vertical extension portion (121), and has a plate-shaped structure bound to a lower end of the safety fence (130) in an integrated structure, and rotatably fixes a lower end of the safety fence position fixing part (140);

wherein the installation support part (110) further includes:

a fixed pulley (115) that is mounted on a lower surface of the lower portion fixing plate (113) and supports vertical driving of a balance wire (116);

the balance wire (116) that is mounted at a lower end of the movement guide (120), extends upward, passes through the fixed pulley (115), and extends downward, and is made of a material having a predetermined strength; and a weight (117) that is mounted at one end of the balance wire (116) and has the same weight as a sum of weights of the movement guide (120) and the safety fence (130); and wherein the safety fence (130) includes:

an upper end ring frame (131) that is bound to an upper end of the movement guide (120) in an integrated structure and has a ring structure corresponding to the inner diameter of the manhole entrance;

a lower end ring frame (132) that is bound to a lower end of the movement guide (120) in an integrated structure and has a ring structure corresponding to the inner diameter of the manhole entrance; and a vertical frame (133) that connects the upper end ring frame (131) and the lower end ring frame (132) in an integrated structure;

wherein the entrance foot plate (118) is adjacent to the upper end guide plate (122) along the upper ring end frame (131), and wherein the upper ring frame (131) and the lower ring frame (132) are each a symmetric circular shape.

* * * * *